United States Patent
Li

(10) Patent No.: US 8,988,821 B2
(45) Date of Patent: Mar. 24, 2015

(54) HARD DISK DRIVE ENCLOSURE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Zhan-Yang Li, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 0 days.

(21) Appl. No.: 14/256,433

(22) Filed: Apr. 18, 2014

(65) Prior Publication Data
US 2014/0375187 A1 Dec. 25, 2014

(30) Foreign Application Priority Data
Jun. 19, 2013 (CN) .......................... 2013 1 0242065

(51) Int. Cl.
*G11B 33/14* (2006.01)
*G06F 1/18* (2006.01)
(52) U.S. Cl.
CPC ...................................... *G06F 1/181* (2013.01)
USPC ..................................................... 360/99.15
(58) Field of Classification Search
USPC ..................................................... 360/99.15
See application file for complete search history.

(56) References Cited

U.S. PATENT DOCUMENTS

| | | | | |
|---|---|---|---|---|
| 6,233,143 B1* | 5/2001 | Gamble et al. | ........... | 361/679.34 |
| 6,288,902 B1* | 9/2001 | Kim et al. | ..................... | 361/725 |
| 6,565,163 B2* | 5/2003 | Behl et al. | ................... | 312/223.1 |
| 7,110,250 B2* | 9/2006 | Lee | ......................... | 361/679.32 |
| 8,238,091 B2* | 8/2012 | Chang et al. | ............. | 361/679.39 |
| 8,644,015 B2* | 2/2014 | Lin et al. | ................... | 361/679.31 |
| 2009/0230276 A1* | 9/2009 | Peng et al. | .................... | 248/544 |

* cited by examiner

Primary Examiner — Mark Blouin
(74) *Attorney, Agent, or Firm* — Novak Druce Connolly Bove + Quigg LLP

(57) ABSTRACT

A hard disk drive enclosure includes a housing and an operation module attached to the housing. The operation module includes a mounting block attached to the housing, a handle pivotably attached to the mounting block, and a sliding member slidably attached to the handle. When the handle is rotated to a closed position, the handle abuts against the mounting block, and the sliding member is slidable between a first position, in which the sliding member is latched to the mounting block for locking the handle at the closed position, and a second position, in which the sliding member is unlatched from the mounting block and the handle is rotatable away from the closed position to an open position. When the handle is rotated to the open position, a free end of the handle is spaced away from the mounting block.

20 Claims, 6 Drawing Sheets

HARD DISK DRIVE ENCLOSURE

FIELD

The present disclosure relates to a hard disk drive enclosure, and more particularly to a hard disk drive enclosure with a handle.

BACKGROUND

A conventional computer system usually includes a drive bracket and at least one hard disk drive secured in the drive bracket by screws. The installation or detachment of the hard disk drive is inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
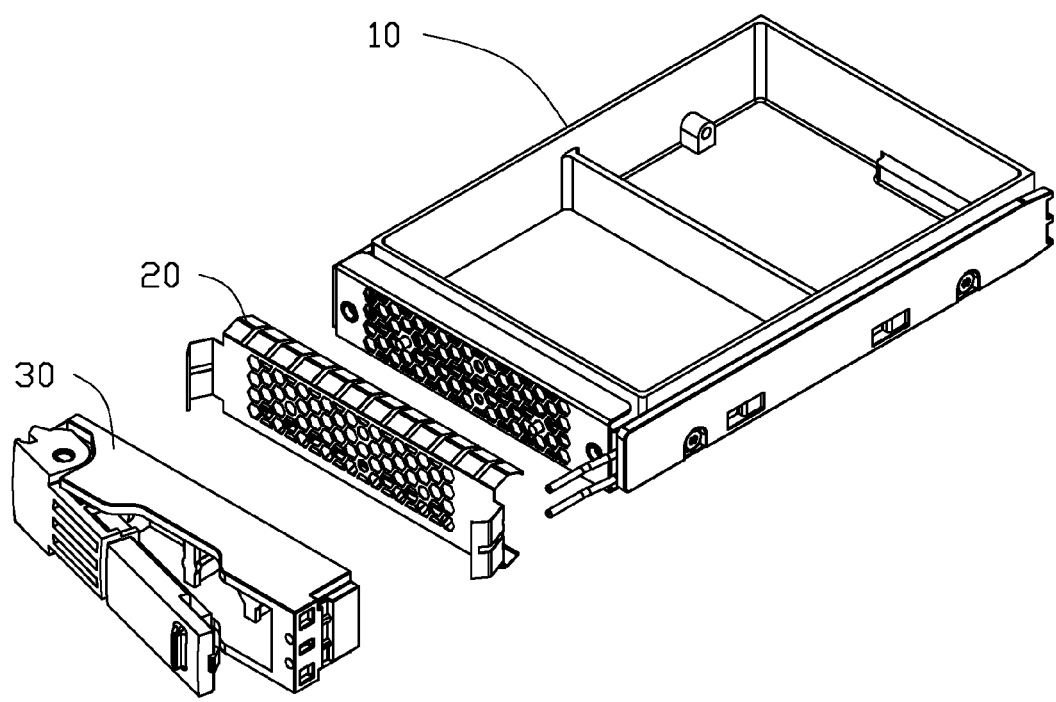
FIG. 1 is an exploded, isometric view of an embodiment of a hard disk drive enclosure.

FIG. 1 shows an embodiment of a hard disk drive enclosure includes a housing 10, an electromagnetic interference (EMI) shielding piece 20, and an operation module 30.

Figure 2:
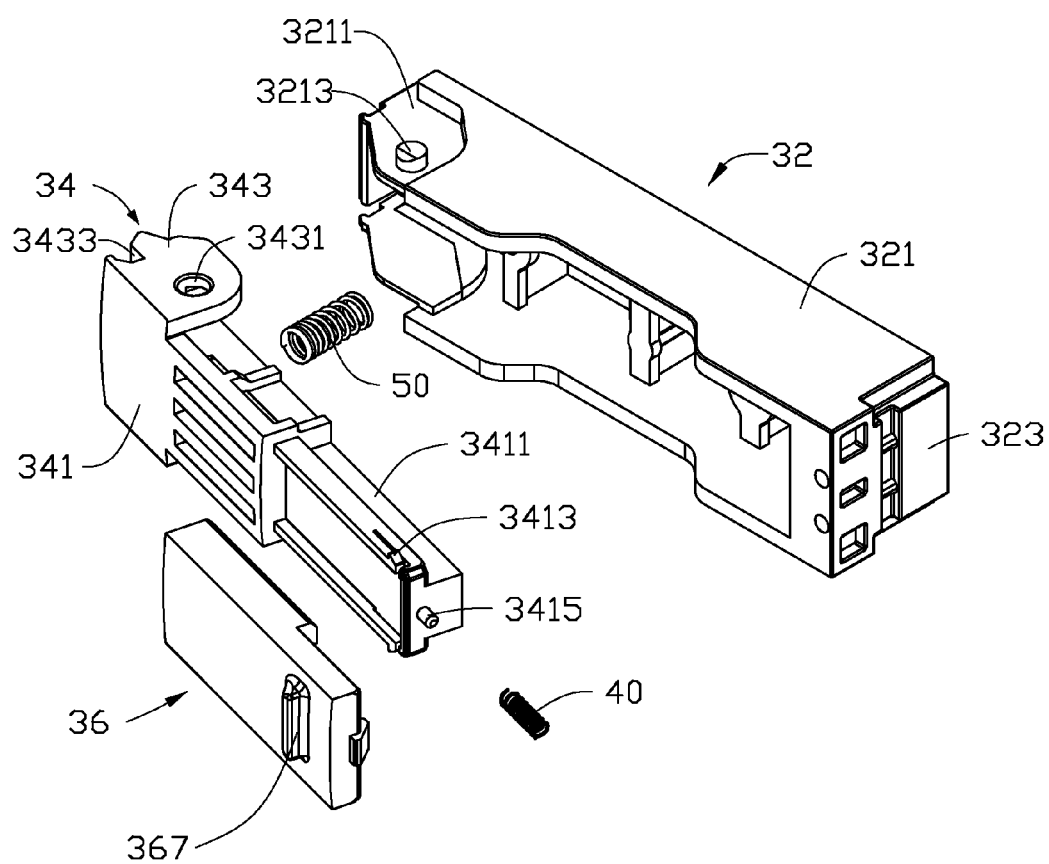
FIG. 2 is an exploded view of an operation module of the hard disk drive enclosure of FIG. 1.
Figure 3:
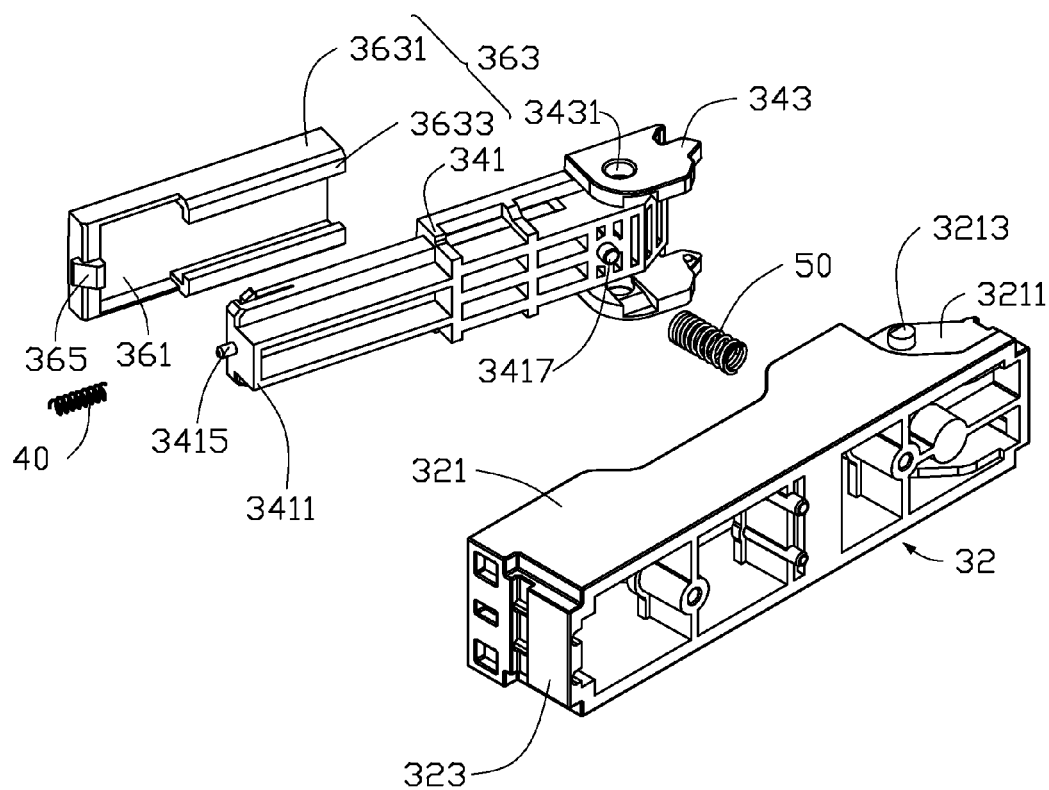
FIG. 3 is similar to FIG. 2, but viewed from another aspect.
Figure 4:
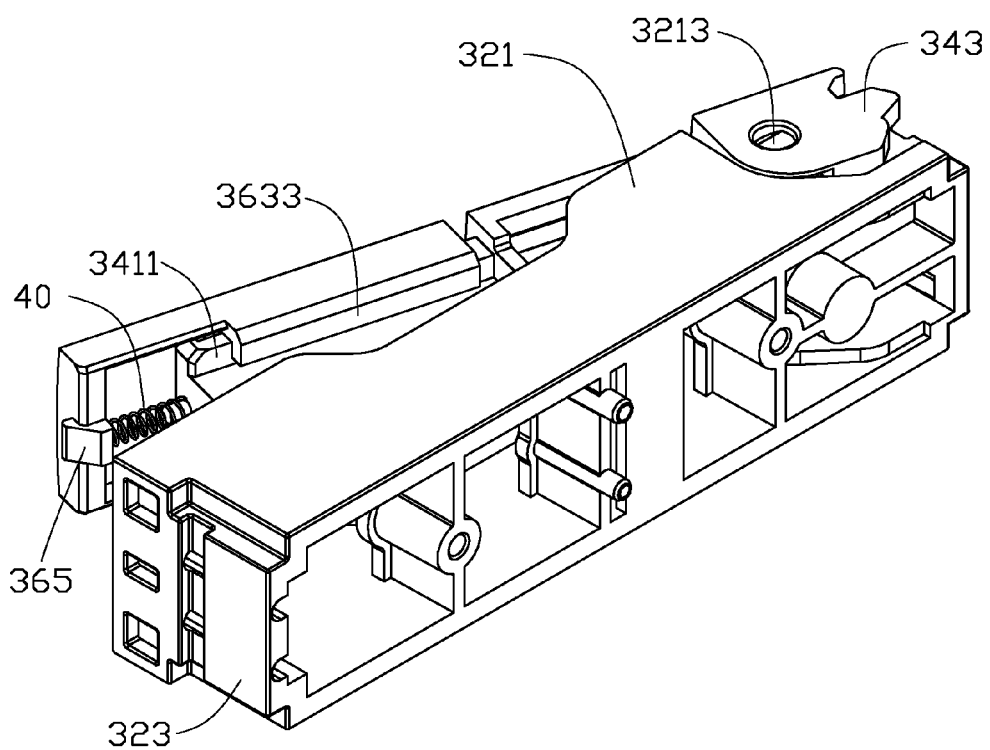
FIG. 4 is an assembled view of the operation module of FIG. 3.

FIGS. 2 and 3 show the operation module 30 includes a mounting block 32, a handle 34, a sliding member 36, a first spring 40, and a second spring 50. The mounting block 32 includes a pair of side panels 321 and a pair of sidewalls 323 substantially perpendicularly connected between the pair of side panels 321. The pair of side panels 321 is parallel to each other. The pair of sidewalls 323 is connected to opposite short edges of each of the pair of side panels 321. A concave portion 3211 is defined in each of the pair of side panels 321 and located adjacent to one of the pair of sidewalls 323. The concave portion 3211 has a bent flange. A mounting post 3213 protrudes from a bottom surface of the concave portion 3211. A height of the mounting post 3213 is substantially equal to a depth of the concave portion 3211.

The handle 34 includes a main body 341 and a pair of mounting pieces 343 extending from the main body 341. The main body 341 includes a front surface. The pair of mounting pieces 343 extends substantially perpendicularly and rearwards from opposite sides of the front surface and is located adjacent to one end of the main body 341. A mounting hole 3431 is defined in each mounting piece 343 corresponding to the mounting post 3213. A gap 3433 is defined in each mounting piece 343 and located at the end of the main body 341. The main body 341 includes a mounting portion 3411 for mounting the sliding member 36. The mounting portion 3411 includes a pair of lengthways flanges and a pair of resilient hooks 3413 extending from the pair of lengthwise flanges. The mounting portion 3411 is located at the other end of the main body 341. A first post 3415 protrudes from the other end of the main body 341 along a horizontal direction for mounting the first spring 40. A second post 3417 protrudes substantially perpendicularly from an inner side of the main body 341 for mounting the second spring 50. The second post 3417 is substantially perpendicular to the first post 3415.

The operation member 36 includes a main panel 361 and a pair of side flanges 363 extending from upper and lower edges of the main panel 361. The main panel 361 has a rectangular shape. Each side flange 363 includes a first section 3631 extending substantially perpendicularly from the main panel 361 and a second section 3633 extending substantially perpendicularly from the first section 3631. A length of the sliding member 36 is greater than the length of the mounting portion 3411. A length of each side flange 363 is less than the length of the mounting portion 3411. A clamping block 365 protrudes from the other short side of the sliding member 36 and is located at a rear side of the sliding member 36. The clamping block 365 has a wedge shape. An operation block 367 protrudes from a front surface of the sliding member 36.

FIGS. 3 to 6 illustrate that during assembly, the second spring 50 is attached to the second post 3417 (See FIG. 3). The mounting piece 343 is positioned in the concave portion 3211. The mounting post 3213 extends through the mounting hole 3431. The handle 34 is pivotably attached to the mounting block 32. One end of the second spring 50 is pressed against the handle 34. The other end of the second spring 50 is pressed against the mounting block 32. The first spring 40 is attached to the first post 3415. The pair of side flanges 363 is aligned with the pair of resilient hooks 3413 and slid across the pair of resilient hooks 3413 along a direction that is opposite to the protruding direction of the first post 3415. The sliding member 36 is slidably attached to the mounting portion 3411. The first sections 3631 of the pair of side flanges 363 abut upper and lower flanges of the mounting portion 3411, thereby preventing the sliding member 36 from moving away from the handle 34 along a first direction that is perpendicular to the first section 3631. The second sections 3633 of the pair of side flanges 363 abuts an inner surface of mounting portion 3411, thereby preventing the sliding member 36 from moving away from the handle 34 along a second direction that is perpendicular to the second section 3633 and the main panel 361. The resilient hook 3413 can prevent the sliding member 36 from moving away from the handle 34 along the protruding direction of the first post 3415 after the sliding member 36 slides across the resilient hook 3413. One end of the first spring 40 is pressed against the mounting portion 3411. The other end of the first spring 40 is pressed against the clamping block 365. Thus, the operation module 30 is assembled. The EMI shielding piece 20 is attached to a front side of the housing 10. The operation member 30 is attached to a front side of the EMI shielding piece 20.

Figure 6:
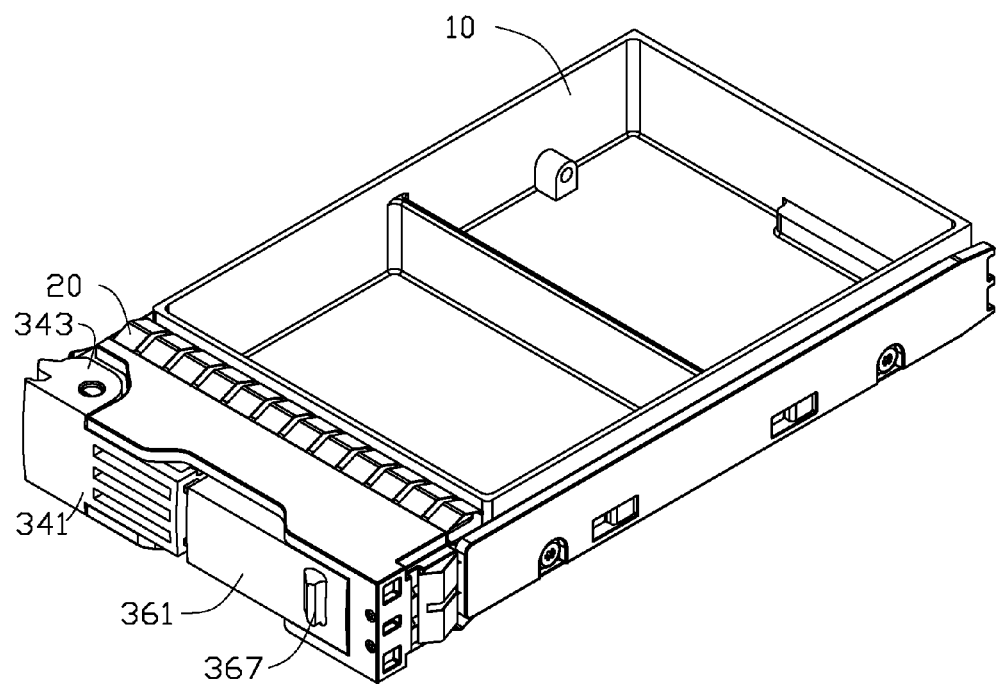
FIG. 6 is similar to FIG. 5, but showing the handle located in a closed position.

When the handle 34 is rotated to a closed position as shown in FIG. 6, the clamping block 365 is latched to an inner side of one of the pair of sidewalls 323. The first spring 40 and the second spring 50 are both compressed. The main panel 361 is substantially perpendicular to both of the side panel 321 and the sidewall 323.

Figure 5:
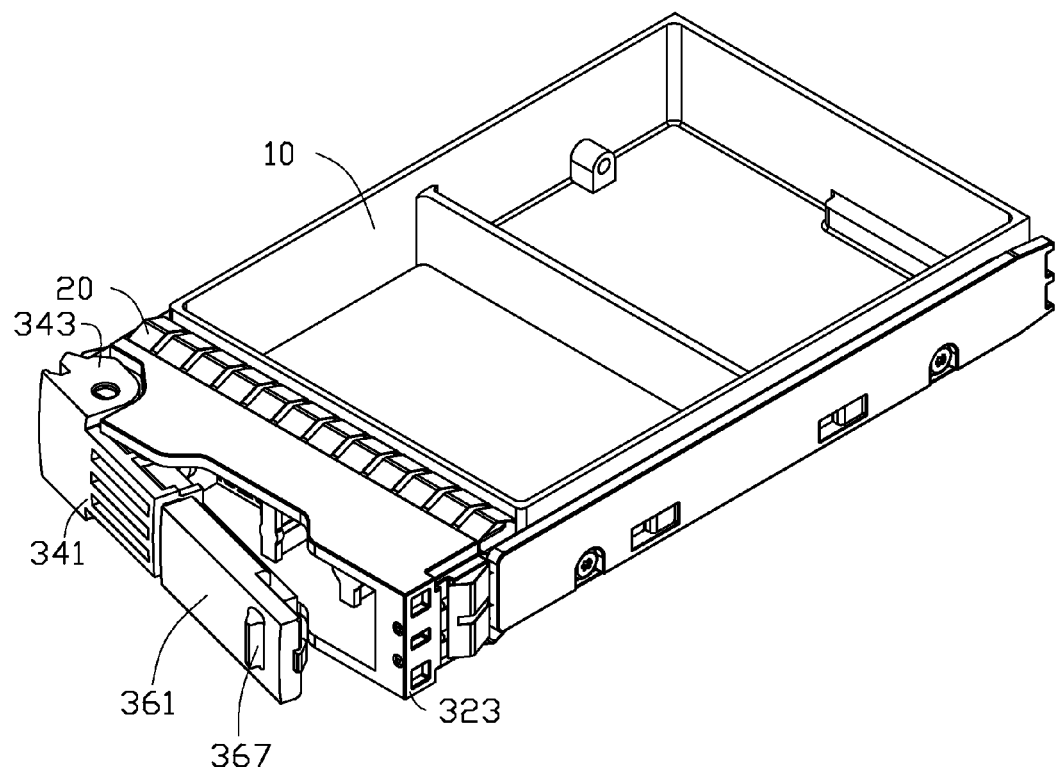
FIG. 5 is an assembled view of the hard disk drive enclosure of FIG. 1, showing a handle of the hard disk drive enclosure located in an open position.

To rotate the handle 34 from the closed position to an open position, the operation block 367 is moved along the direction that is opposite to the protruding direction of the first post 3415. The clamping block 365 is unlatched from the sidewall 323. The second spring 50 urges the handle 34 to rotate outwardly to the open position as shown in FIG. 5. The first spring 40 urges the sliding member 36 to move along the protruding direction of the first post 3415 until the sliding member 36 is blocked by the resilient hook 3413. When the handle 34 is rotated to the open position, an acute angle is formed between the handle 34 and the mounting block 32.

When the handle 34 is rotated to the closed position, the gap 3433 can be engaged with a latch portion of a computer, thereby securing the hard disk drive enclosure in the computer. When the handle 34 is rotated to the open position, the gap 3433 is disengaged away from the latch portion of the computer, thereby allowing detachment of the hard disk drive enclosure from the computer. The handle 34 can facilitate mounting or dismounting of the hard disk drive.

It is to be understood, however, that even though numerous characteristics and advantages have been set forth in the foregoing description of embodiments, together with details of the structures and functions of the embodiments, the disclosure is illustrative only and changes may be made in detail, including matters of shape, size, and arrangement of parts within the principles of the disclosure. The embodiments discussed herein do not limit the following claims.

What is claimed is:

1. A hard disk drive enclosure, comprising:
a housing; and
an operation module comprising a mounting block attached to the housing, a handle pivotably attached to the mounting block, and a sliding member slidably attached to the handle; a rotation axis of the handle being perpendicular to a sliding direction of the sliding member;
wherein when the handle is rotated to a closed position, the handle abuts against the mounting block, and the sliding member is slidable between a first position, in which the sliding member is latched to the mounting block for locking the handle at the closed position, and a second position, in which the sliding member is unlatched from the mounting block and the handle is rotatable away from the closed position to an open position; when the handle is rotated to the open position, a free end of the handle is spaced away from the mounting block.

2. The hard disk drive enclosure of claim 1, wherein a first spring is interposed between the free end of the handle and the sliding member and capable of urging the sliding member to slide from the second position to the first position.

3. The hard disk drive enclosure of claim 2, wherein a second spring is located between the mounting block and the handle and capable of urging the handle to rotate to the open position when the sliding member is unlatched from the mounting block.

4. The hard disk drive enclosure of claim 3, wherein a first post protrudes from the free end of the handle along a first direction that is substantially parallel to the sliding direction of the sliding member for mounting the first spring, and a second post protrudes from an inner side of the handle along a second direction that is substantially perpendicular to the first direction for mounting the second spring.

5. The hard disk drive enclosure of claim 1, wherein the handle comprises a mounting portion for slidably mounting the sliding member, and the sliding member comprises a main panel and a pair of side flanges extending from opposite long edges of the main panel, the main panel abuts a front side of the mounting portion, and the pair of side flanges abuts an rear side of the mounting portion.

6. The hard disk drive enclosure of claim 5, wherein a pair of resilient hooks extends from opposite long sides of the mounting portion for preventing the sliding member from sliding away from the mounting portion.

7. The hard disk drive enclosure of claim 6, wherein a clamping block extends from a short side the main panel, when the sliding member is located in the first position, the clamping block is latched to the mounting block; and when the sliding member is slid to the second position, the clamping block is unlatched from the mounting block.

8. The hard disk drive enclosure of claim 7, wherein the handle comprises a pair of mounting pieces extending substantially perpendicularly from a front surface of the handle, a mounting hole is defined in each mounting piece; the mounting block comprises a mounting post extending through the mounting hole for pivotably attaching the handle to the mounting block.

9. The hard disk drive enclosure of claim 8, wherein the mounting block comprises a pair of side panels and a pair of sidewalls substantially perpendicularly connected between the pair of side panels; a concave portion is defined in each of the pair of side panels and located adjacent to one of the pair of sidewalls for mounting each mounting piece, and the mounting post protrudes from a bottom surface of the concave portion.

10. The hard disk drive enclosure of claim 9, wherein when the handle is rotated to the closed position, the main panel is substantially perpendicular to the pair of side panels and the pair of sidewalls; and when the handle is rotated to the open position, an acute angle is formed between the handle and the mounting block.

11. A hard disk drive enclosure, comprising:
a housing;
an electromagnetic interference (EMI) shielding piece attached to the housing;
an operation module comprising a mounting block attached to the EMI shielding piece, a handle pivotably attached to the mounting block, and a sliding member slidably attached to the handle; a rotation axis of the handle being perpendicular to a sliding direction of the sliding member; and
an EMI shielding member
wherein when the handle is rotated to a closed position, the handle abuts against the mounting block, and the sliding member is slidable between a first position, in which the sliding member is latched to the mounting block for locking the handle at the closed position, and a second position, in which the sliding member is unlatched from the mounting block and the handle is rotatable away from the closed position to an open position; when the handle is rotated to the open position, a free end of the handle is spaced away from the mounting block.

12. The hard disk drive enclosure of claim 11, wherein a first spring is located between the free end of the handle and the sliding member and capable of urging the sliding member to slide from the second position to the first position.

13. The hard disk drive enclosure of claim 12, wherein a second spring is located between the mounting block and the handle and capable of urging the handle to rotate to the open position when the sliding member is unlatched from the mounting block.

14. The hard disk drive enclosure of claim 13, wherein a first post protrudes from the free end of the handle along a first direction that is substantially parallel to the sliding direction of the sliding member for mounting the first spring, and a second post protrudes from an inner side of the handle along a second direction that is substantially perpendicular to the first direction for mounting the second spring.

15. The hard disk drive enclosure of claim 11, wherein the handle comprises a mounting portion for slidably mounting the sliding member, and the sliding member comprises a main panel and a pair of side flanges extending from opposite long edges of the main panel, the main panel abuts a front side of the mounting portion, and the pair of side flanges abuts an rear side of the mounting portion.

16. The hard disk drive enclosure of claim 15, wherein a pair of resilient hooks extends from opposite long sides of the mounting portion for preventing the sliding member from sliding away from the mounting portion.

17. The hard disk drive enclosure of claim 16, wherein each side flange comprises a first section extending substantially perpendicularly from the main panel and a second section extending substantially perpendicularly from the first section; a length of the sliding member is greater than the length of the mounting portion, and a length of each side flange is less than the length of the mounting portion.

18. The hard disk drive enclosure of claim 15, wherein the handle comprises a pair of mounting pieces extending substantially perpendicularly from a front surface of the handle, a mounting hole is defined in each mounting piece; and the mounting block comprises a mounting post extending through the mounting hole for pivotably attaching the handle to the mounting block.

19. The hard disk drive enclosure of claim 18, wherein the mounting block comprises a pair of side panels and a pair of sidewalls substantially perpendicularly connected between the pair of side panels; a concave portion is defined in each of the pair of side panels and located adjacent to one of the pair of sidewalls for mounting each mounting piece, and the mounting post protrudes from a bottom surface of the concave portion.

20. The hard disk drive enclosure of claim 19, wherein when the handle is rotated to the closed position, the main panel is substantially perpendicular to the pair of side panels and the pair of sidewalls; and when the handle is rotated to the open position, an acute angle is formed between the handle and the mounting block.

\* \* \* \* \*